United States Patent
Li et al.

(10) Patent No.: US 8,836,275 B2
(45) Date of Patent: Sep. 16, 2014

(54) CHARGING AND DISCHARGING MANAGEMENT APPARATUS AND MOBILE TERMINAL

(71) Applicant: Huawei Device Co., Ltd., Guangdong (CN)

(72) Inventors: Changqi Li, Xi'an (CN); Nan Lu, Xi'an (CN); Fengxin Wang, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 91 days.

(21) Appl. No.: 13/693,788

(22) Filed: Dec. 4, 2012

(65) Prior Publication Data
US 2014/0002028 A1    Jan. 2, 2014

Related U.S. Application Data

(63) Continuation of application No. PCT/CN2012/077652, filed on Jun. 27, 2012.

(51) Int. Cl.
*H02J 7/00*    (2006.01)
*G06F 1/32*    (2006.01)
*G06F 1/26*    (2006.01)

(52) U.S. Cl.
CPC ............. *H02J 7/0013* (2013.01); *G06F 1/3212* (2013.01); *G06F 1/263* (2013.01)
USPC ............ 320/106; 320/110; 320/126; 320/128

(58) Field of Classification Search
USPC ................. 320/106, 110, 113, 126, 127, 128; 307/119, 125, 134, 139, 140
See application file for complete search history.

(56) References Cited

U.S. PATENT DOCUMENTS

| 5,784,626 A | * | 7/1998 | Odaohara ...................... 713/300 |
| 2008/0067975 A1 | * | 3/2008 | Law .............................. 320/110 |
| 2012/0262121 A1 | * | 10/2012 | Kuo et al. ..................... 320/126 |
| 2012/0299533 A1 | * | 11/2012 | Huffman et al. .............. 320/107 |

FOREIGN PATENT DOCUMENTS

| CN | 1633193 A | 6/2005 |
| CN | 101378558 A | 3/2009 |
| CN | 101771293 A | 7/2010 |

OTHER PUBLICATIONS

International Search Report and Written Opinion of the International Searching Authority in corresponding International Patent Application No. PCT/CN2012/077652 (Feb. 14, 2013).

* cited by examiner

*Primary Examiner* — Richard V Muralidar
*Assistant Examiner* — Michael Dibenedetto
(74) *Attorney, Agent, or Firm* — Leydig, Voit & Mayer, Ltd.

(57) ABSTRACT

Embodiments of the present invention disclose a charging and discharging management apparatus and a mobile terminal. The charging and discharging management apparatus may include a charging and discharging management chip, primary battery positive and negative electrode contacts, secondary battery positive and negative electrode contacts, and electronic switches connected to the primary battery positive and negative electrode contacts and the secondary battery positive and negative electrode contacts, a detecting unit configured to detect in-place states of a primary battery and a secondary battery, and an electronic switch controlling unit connected to the detecting unit and configured to control the electronic switches to be on/off according to the in-place states of the batteries to enable the charging and discharging management chip to perform charging and discharging management for a battery in place.

15 Claims, 6 Drawing Sheets

CHARGING AND DISCHARGING MANAGEMENT APPARATUS AND MOBILE TERMINAL

CROSS-REFERENCE TO RELATED APPLICATIONS

This application is a continuation of International Patent Application No. PCT/CN2012/077652, filed on Jun. 27, 2012, which is hereby incorporated by reference in its entirety.

FIELD OF THE INVENTION

The present invention relates to charging and discharging management technologies, and in particular, to a charging and discharging management apparatus and a mobile terminal.

BACKGROUND OF THE INVENTION

At present, mobile terminal products available in the market, such as a mobile phone and a data card, are basically capable of performing charging and discharging management for only one battery at the same time. However, the capacity of one battery is limited, which results in a limited time for supplying power for a mobile terminal product. When the capacity of the battery of the mobile terminal product is exhausted, a user of the mobile terminal product must charge the battery. A battery is charged in a following mode: powering off a mobile terminal product, taking off the battery, and putting it on a dedicated charging device for charging; or, using a USB connection wire or the like to connect a charging interface of a handheld terminal product to a device capable of charging a battery, thereby charging the battery. If the battery is charged in the first mode, the user must power off the mobile terminal product and the user cannot use the mobile terminal product during such a period. If the battery is charged in the second mode, the location where the user uses the mobile terminal product is limited to a small area. That is, when the user charges the mobile terminal product, the mobile terminal product must be powered off or the location where the user uses the mobile terminal product is limited to a small area.

SUMMARY OF THE INVENTION

Embodiments of the present invention provide a charging and discharging management apparatus and method, so that a mobile terminal product can work without power-off and that a user of the mobile terminal product can use the mobile terminal product freely.

In one aspect of embodiments of the present invention, a charging and discharging management apparatus is provided, where the charging and discharging management apparatus includes a charging and discharging management chip, primary battery positive and negative electrode contacts, secondary battery positive and negative electrode contacts, and electronic switches connected to the primary battery positive and negative electrode contacts and the secondary battery positive and negative electrode contacts, and further includes:

a detecting unit configured to detect in-place states of a primary battery and a secondary battery; and an electronic switch controlling unit connected to the detecting unit and configured to control the electronic switches to be on/off according to the in-place states of the batteries, so that the charging and discharging management chip performs charging and discharging management for a battery in place;

wherein the electronic switch controlling unit includes a controller, a first control interface, a comparator, an AND gate, and a second control interface; the first control interface and the second control interface are connected to the controller; the first control interface is further connected to the primary battery negative electrode contact and the secondary battery positive electrode contact through the electronic switches; an input end of the comparator is connected to the secondary battery positive electrode contact, another input end inputs a fixed voltage, and an output end is connected to an input end of the AND gate; another input end of the AND gate is connected to the second control interface, and an output end of the AND gate is connected to the primary battery positive electrode contact and the secondary battery negative electrode contact through the electronic switches; and the controller controls the electronic switches to be on/off by using the first control interface and the second control interface to enable the charging and discharging management chip to perform charging and discharging management for a battery in place.

The controller controls the electronic switches to be on/off by using the first control interface according to the in-place states of the primary battery and the secondary battery detected by the detecting unit, so that the primary battery negative electrode contact is connected to the charging and discharging management chip while the secondary battery positive electrode contact is not connected to the charging and discharging management chip, or that the primary battery negative electrode contact is not connected to the charging and discharging management chip while the secondary battery positive electrode contact is connected to the charging and discharging management chip.

When the detecting unit detects that the primary battery is in place while the secondary battery is out of place, the controller controls the electronic switches to be on/off by using the first control interface so that the primary battery negative electrode contact is connected to the charging and discharging management chip while the secondary battery positive electrode contact is not connected to the charging and discharging management chip.

When the detecting unit detects that the secondary battery is in place while the primary battery is out of place, the controller controls the electronic switches to be on/off by using the first control interface so that the primary battery negative electrode contact is not connected to the charging and discharging management chip while the secondary battery positive electrode contact is connected to the charging and discharging management chip, and meanwhile, the controller enables the AND gate by using the second control interface to output HIGH at the output end to control the electronic switch so that the secondary battery negative electrode contact is connected to the charging and discharging management chip.

The primary battery negative electrode contact is also connected to the charging and discharging management chip through a diode.

The number of secondary battery positive and negative electrode contacts is at least one pair.

In another aspect of embodiments of the present invention, a mobile terminal is provided, where the mobile terminal includes a primary battery, a secondary battery, and a charging and discharging management apparatus, and the charging and discharging management apparatus supplies power for the mobile terminal by using the primary battery or the secondary battery.

The mobile terminal is a mobile phone.

The charging and discharging management apparatus according to the present invention may use two or more batteries to take turns to supply power for a mobile terminal product, so that the mobile terminal product can work longer without power-off and that a user of the mobile terminal product can use the mobile terminal product freely. In addition, because the mobile terminal product may be powered by using two or more batteries, when one battery of the mobile terminal product is exhausted, it is not necessary to power off the mobile terminal product. That is, the exhausted battery may be taken off and be charged by using a charging device when the mobile terminal product is in normal use. Meanwhile, when both batteries of the mobile terminal product are unexhausted, hot swapping of a secondary battery of the mobile terminal product is supported.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following descriptions merely show some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

In embodiments of the present invention, a primary battery positive electrode contact refers to a contact for contacting a primary battery positive electrode to make an electrical connection but not a contact on the primary battery; similarly, a primary battery negative electrode contact refers to a contact for connecting a primary battery negative electrode to make an electrical connection, a secondary battery positive electrode contact refers to a contact for contacting a secondary battery positive electrode to make an electrical connection, and a secondary battery negative electrode contact refers to a contact for contacting a secondary battery negative electrode to make an electrical connection.

In embodiments of the present invention, a mobile terminal product is normally a mobile phone, and may also be a mobile terminal such as an MP3 player, a PAD, a notebook computer, and a data card.

In embodiments of the present invention, charging and discharging refers to charging and discharging a battery, where a battery is discharged to supply power for a mobile terminal product.

Figure 1:
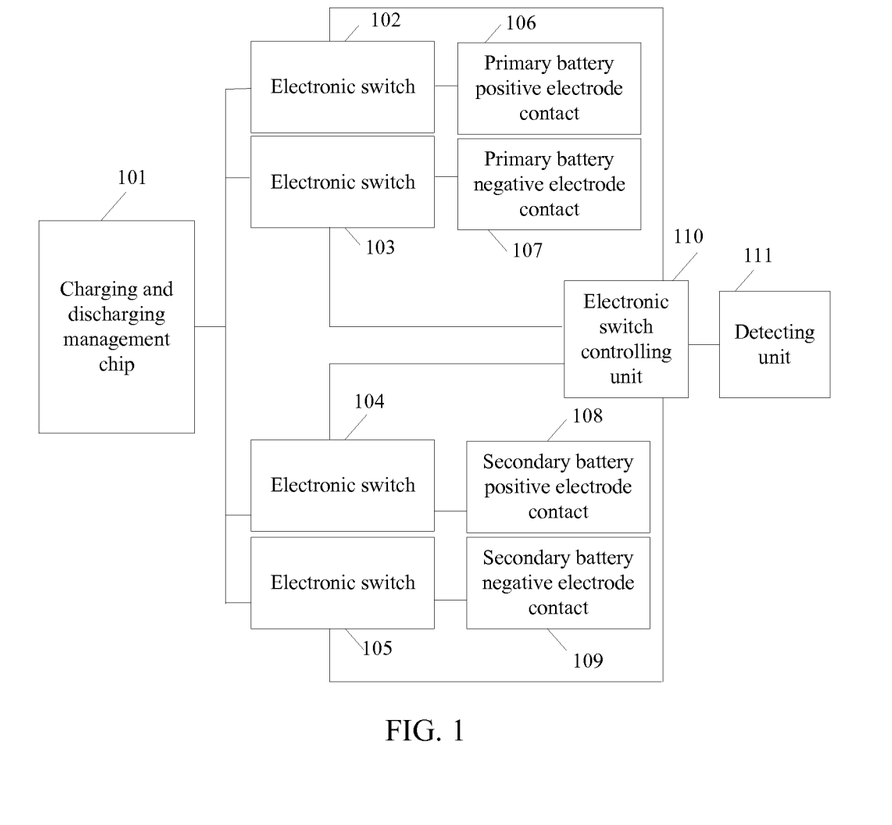
FIG. 1 is a schematic diagram of a dual-battery charging and discharging management apparatus according to an embodiment of the present invention.

FIG. 1 shows a dual-battery charging and discharging management apparatus according to an embodiment of the present invention, where the dual-battery charging and discharging management apparatus is used to manage charging and discharging of two batteries. The charging and discharging management apparatus includes a charging and discharging management chip 101, a primary battery positive electrode contact 106, a primary battery negative electrode contact 107, a secondary battery positive electrode contact 108, a secondary battery negative electrode contact 109, an electronic switch 102 connected to the primary battery positive electrode contact 106, an electronic switch 103 connected to the primary battery negative electrode contact 107, an electronic switch 104 connected to the secondary battery positive electrode contact 108, an electronic switch 105 connected to the secondary battery negative electrode contact 109, an electronic switch controlling unit 110 connected to the electronic switches 102, 103, 104, and 105, and a detecting unit 111 connected to the electronic switch controlling unit 110.

The working process of the dual-battery charging and discharging management apparatus is as follows:

The detecting unit 111 detects in-place states of a primary battery and a secondary battery. The detecting unit 111 may detect an in-place state of a battery by temp detection, that is, detecting a temperature detection pin of the battery; or may detect an in-place state of a battery by using an ID wire of the battery.

The electronic switch controlling unit 110 controls the electronic switches to be on/off according to the in-place states of the primary battery and the secondary battery detected by the detecting unit 111, so that the charging and discharging management chip performs charging and discharging management for a battery in place. Specifically, when the detecting unit 111 detects that the primary battery is in place while the secondary battery is out of place, the electronic switch controlling unit 110 controls the electronic switch 102 and the electronic switch 103 to be on, so that the charging and discharging management chip performs charging and discharging management for the primary battery. When the detecting unit 111 detects that the secondary battery is in place while the primary battery is out of place, the electronic switch controlling unit 110 controls the electronic switch 104 and the electronic switch 105 to be on, so that the charging and discharging management chip performs charging and discharging management for the secondary battery. When the detecting unit 111 detects that the primary battery and the secondary battery are both in place, the electronic switch controlling unit 110 controls the electronic switches to be on/off according to actual situations so that the charging and discharging management chip performs charging and discharging management for the primary battery or the secondary battery. For example, when the primary battery is full while the secondary battery is low, the electronic switch controlling unit 110 controls the electronic switch 102 and the electronic switch 103 to be on, so that the charging and discharging management chip performs discharging management for the primary battery to supply power for the mobile terminal product; otherwise, controls the electronic switch 104 and the electronic switch 105 to be on, so that the charging and discharging management chip performs discharging management for the secondary battery.

Figure 1A:
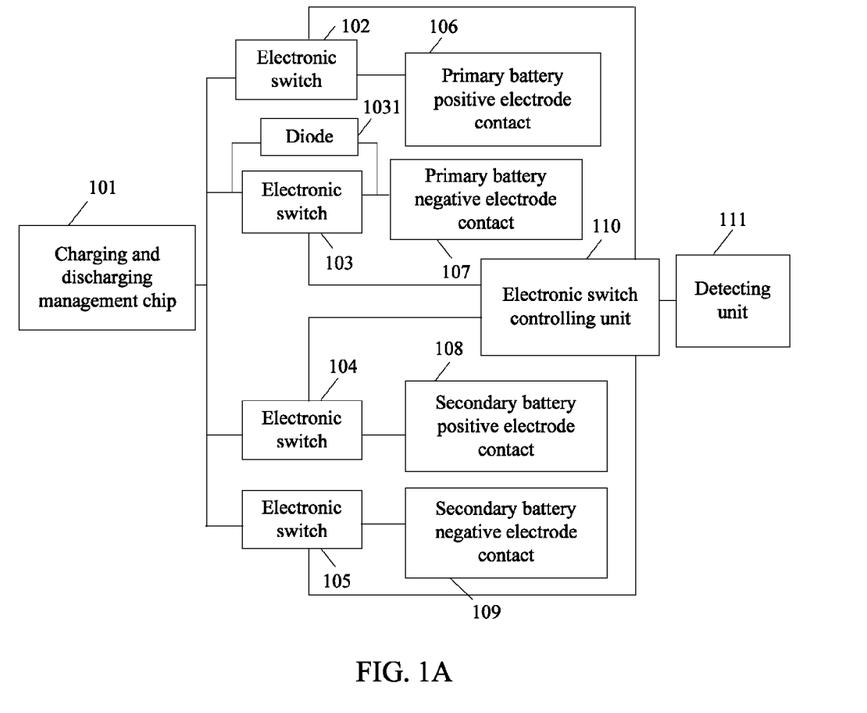
FIG. 1A is a schematic diagram of a dual-battery charging and discharging management apparatus according to another embodiment of the present invention.

A diode may be connected in parallel to the electronic switch 103, as shown in FIG. 1A. That is, the primary battery negative electrode contact may also be connected to the charging and discharging management chip through the diode, so that in an emergency when the electronic switch 103 is not on, the primary battery negative electrode contact may be connected to the charging and discharging management chip through the diode, thereby implementing hot swapping for the secondary battery.

Figure 1B:
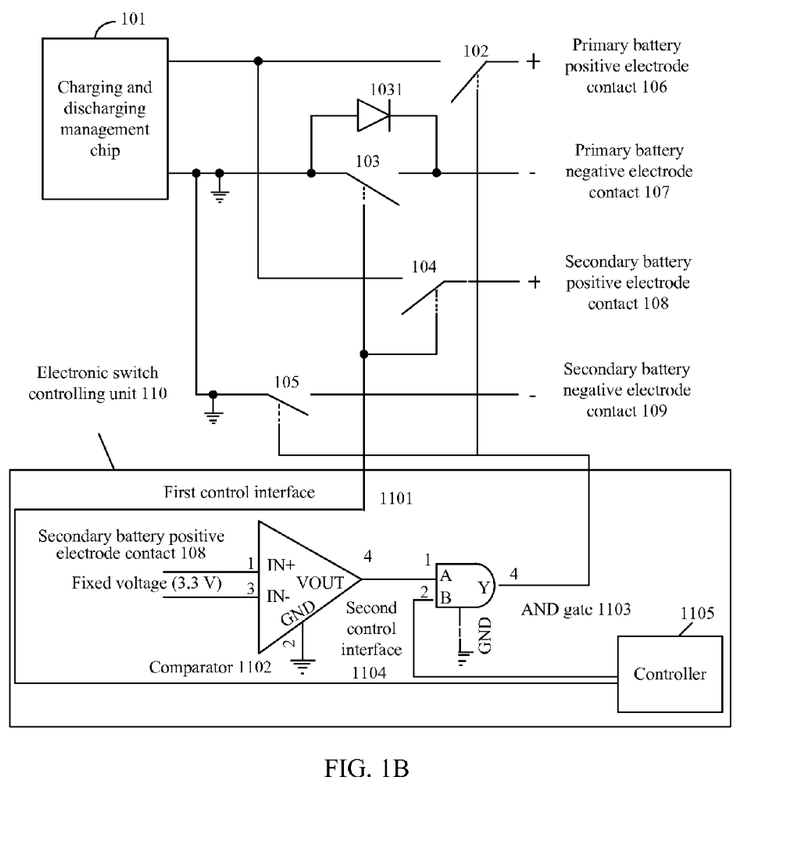
FIG. 1B is a schematic circuit diagram of a dual-battery charging and discharging management apparatus according to the present invention.

FIG. 1B shows a schematic circuit diagram of a dual-battery charging and discharging management apparatus according to the present invention. As shown in a dashed line box, an electronic switch controlling unit 110 specifically includes a controller 1105, a first control interface 1101, a comparator 1102, an AND gate 1103, and a second control interface 1104, where the first control interface 1101 and the second control interface 1104 are connected to the controller 1105; the first control interface 1101 is further respectively connected to a primary battery negative electrode contact through an electronic switch 103 and to a secondary battery positive electrode contact through an electronic switch 104; an input end of the comparator 1102 is connected to the secondary battery positive electrode contact 108, another input end inputs a fixed voltage (which varies according to the power supply voltage of a mobile terminal product; when the mobile terminal product is a mobile phone, the fixed voltage is normally 3.3 V), and an output end is connected to an input end of the AND gate 1103; another input end of the AND gate 1103 is connected to the second control interface 1104, and an output end of the AND gate is respectively connected to a primary battery positive electrode contact through an electronic switch 102 and to a secondary battery negative electrode contact through an electronic switch 105; and the controller 1105 may be a processor executing software. When the controller 1105 may be a processor executing software, the first control interface 1101 and the second control interface 1104 are software interfaces.

The controller 1105 controls the electronic switches 102 to 105 to be on/off by using the first control interface 1101 according to in-place states of the primary battery and the secondary battery detected by the detecting unit, so that the primary battery negative electrode contact 107 is connected to a charging and discharging management chip 101 while the secondary battery positive electrode contact 108 is not connected to the charging and discharging management chip 101, or that the primary battery negative electrode contact 103 is not connected to the charging and discharging management chip while the secondary battery positive electrode contact 104 is connected to the charging and discharging management chip 101.

When the detecting unit detects that the primary battery is out of place, the controller 1105 controls the electronic switch 103 to be off and 104 to be on by using the first control interface 1101 so that the primary battery negative electrode contact 107 is not connected to the charging and discharging management chip 101 while the secondary battery positive electrode contact 108 is connected to the charging and discharging management chip 101; and meanwhile, the second control interface 1104 inputs HIGH to enable the AND gate to output HIGH at the output end to control the electronic switch 105 to be on, so that the secondary battery negative electrode contact is connected to the charging and discharging management chip 101.

Specifically, when the detecting unit detects that the primary battery is in place while the secondary battery is out of place, the controller 1105 inputs HIGH through the first control interface 1101 to control the electronic switch 103 to be on and the electronic switch 104 to be off. In such cases, because the secondary battery is out of place, the comparator 1102 outputs LOW; regardless of whether the controller 1105 inputs HIGH or LOW through the second control interface 1104, the AND gate 1103 outputs LOW, so that the electronic switch 102 is on and that the electronic switch 105 is off. In such cases, the primary battery in place is connected to the charging and discharging management chip 101, and the power source management chip 101 performs charging and discharging management for the primary battery.

When the detecting unit detects that the secondary battery is in place while the primary battery is out of place, the controller 1105 inputs LOW through the first control interface 1101 to control the electronic switch 104 to be on and the electronic switch 103 to be off. In such cases, as long as the voltage of the secondary battery is higher than the fixed voltage (which varies according to the power supply voltage of a mobile terminal product; when the mobile terminal product is a mobile phone, the fixed voltage normally is 3.3 V), the comparator 1102 outputs HIGH, and the controller 1105 inputs HIGH through the second control interface 1104 at the same time, so that the AND gate 1103 inputs HIGH to control the electronic switch 105 to be on and 102 to be off. In such cases, the secondary battery in place is connected to the power source management chip 101 and the power source management chip 101 performs charging and discharging management for the secondary battery.

When the detecting unit detects that the primary battery and the secondary battery are both in place, as long as the capacity of the primary battery or the secondary battery is sufficient for powering on the mobile terminal product, the electronic switch controlling unit 110 may control the electronic switches 102 to 105 to perform charging and discharging management for the batteries. The following table describes a truth table in which the electronic switch controlling unit 110 controls the electronic switches 102 to 105 to enable the batteries to supply power for the mobile terminal product, where "0" indicates a low level and "1" indicates a high level.

TABLE 1.1

| | First Control Interface | Second Control Interface | Comparator Output | Electronic Switch 105 | Electronic Switch 104 | Electronic Switch 103 | Electronic Switch 102 | Result |
|---|---|---|---|---|---|---|---|---|
| When the voltage of the secondary | 0 | 0 | 1 | Off | On | Off | On | A positive electrode of the primary battery is connected to the charging and discharging management chip, a negative electrode is disconnected, |

TABLE 1.1-continued

| | First Control Interface | Second Control Interface | Comparator Output | Electronic Switch 105 | Electronic Switch 104 | Electronic Switch 103 | Electronic Switch 102 | Result |
|---|---|---|---|---|---|---|---|---|
| battery is greater than 3.3 V | | | | | | | | and this also applies to the secondary battery. In such cases, no battery supplies power. This case does not exist because a case in which the first control interface and the second control interface are the same will not occur for normal software logic, and may occur only in cases of software breakdown or faults. |
| | 0 | 1 | 1 | On | On | Off | Off | The secondary battery supplies power. |
| | 1 | 0 | 1 | Off | Off | On | On | The primary battery supplies power. |
| | 1 | 1 | 1 | On | Off | On | Off | The negative electrode of the primary battery is connected to the charging and discharging chip, and the positive electrode is disconnected; the negative electrode of the secondary battery is connected to the charging and discharging chip, and the positive electrode is disconnected. In such cases, no battery supplies power. This case does not exist because a case in which the first control interface and the second control interface are the same will not occur for normal software logic, and may occur only in cases of software breakdown or faults. |
| When the voltage of the secondary battery is less than 3.3 V or the secondary battery is suddenly taken off | 0 | 0 | 0 | Off | On | Off | On | The positive electrode of the primary battery is connected to the charging and discharging chip, and the negative electrode is disconnected; the positive electrode of the secondary battery is connected to the charging and discharging chip, and the negative electrode is disconnected. This is a transition state when the secondary battery is suddenly taken off. The primary battery supplies power for the charging and discharging management chip through the electronic switch 102 and the diode connected in parallel to the electronic switch 103. However, this case does not exist because a case in which the first control interface and the second control interface are the same will not occur for normal software logic, and may occur only in cases of software breakdown or faults. |
| | 0 | 1 | 0 | Off | On | Off | On | The primary battery supplies power. This is a transition state when the secondary battery is suddenly taken off. The primary battery supplies power for the charging and discharging management chip through the electronic switch 102 and the diode connected in parallel to the electronic switch 103. |
| | 1 | 0 | 0 | Off | Off | On | On | The primary battery supplies power. |
| | 1 | 1 | 0 | Off | Off | On | On | The primary battery supplies power. However, this case does not exist because a case in which the first control interface and the second control interface are the same will not occur for normal software logic, and may occur only in cases of software breakdown or faults. |

When the secondary battery is in place and supplies power while the primary battery is also in place but does not supply power, the capacity of the primary battery is sufficient for powering on the mobile terminal product, and the secondary battery is suddenly taken off by a user or fails, the voltage input by the input end of the comparator 1102 connected to the secondary battery positive electrode contact 108 drops quickly to be lower than the fixed voltage (which varies according to the power supply voltage of the mobile terminal product; when the mobile terminal product is a mobile phone, the fixed voltage normally is 3.3 V), and the comparator 1102 outputs LOW. In such cases, regardless of the input of the controller 1105 through the second control interface 1104, the AND gate outputs LOW and the electronic switch 102 is on, so that the primary battery positive electrode contact 106 may be connected to the charging and discharging management chip 101 through the electronic switch 102. In such cases, because the electronic switch 103 may be in the off state, the primary battery negative electrode contact is not connected to the charging and discharging management chip. If the diode 1031 is connected in parallel to the electronic switch 103, in such cases, the primary battery negative electrode contact is connected to the charging and discharging management chip. In such cases, after the secondary battery supplying power for the mobile terminal product fails to supply power due to various reasons, the primary battery of the mobile terminal product may be connected to the charging and discharging management chip and temporarily supply power for the mobile terminal product. That is, the diode 1031 is capable of implementing hot swapping for the secondary battery. Certainly, the diode 1031 is not necessarily required for embodiments of the present invention. When the detecting unit detects that the secondary battery is out of place while the primary battery is in place, the controller 1105 inputs HIGH through the first control interface 1101 to control the electronic switch 103 to be on and the electronic switch 104 to be off. In such cases, because the secondary battery is out of place, the comparator 1102 outputs LOW; regardless of whether the controller 1105 inputs HIGH or LOW through the second control interface 1104, the AND gate 1103 outputs LOW, so that the electronic switch 102 is on and that 105 is off. In such cases, the primary battery in place is connected to the power source management chip 101, and the power source management chip 101 performs charging and discharging management for the primary battery.

When the primary battery is in place and supplies power, but the secondary battery is out of place, and the detecting unit detects that the secondary battery is in place after the secondary battery is installed on the mobile terminal product, as long as the capacity of the primary battery or the secondary battery is sufficient for powering on the mobile terminal product, the electronic switch controlling unit 110 may control the electronic switches 102 to 105 to perform any charging and discharging management for the batteries. For example, if the controller 1105 is a software product and the first control interface 1101 and the second control interface 1104 are software interfaces, a truth table in which the electronic switch controlling unit 110 controls the electronic switches 102 to 105 to enable the batteries to supply power for the mobile terminal product is shown in Table 1.1.

Figure 1C:
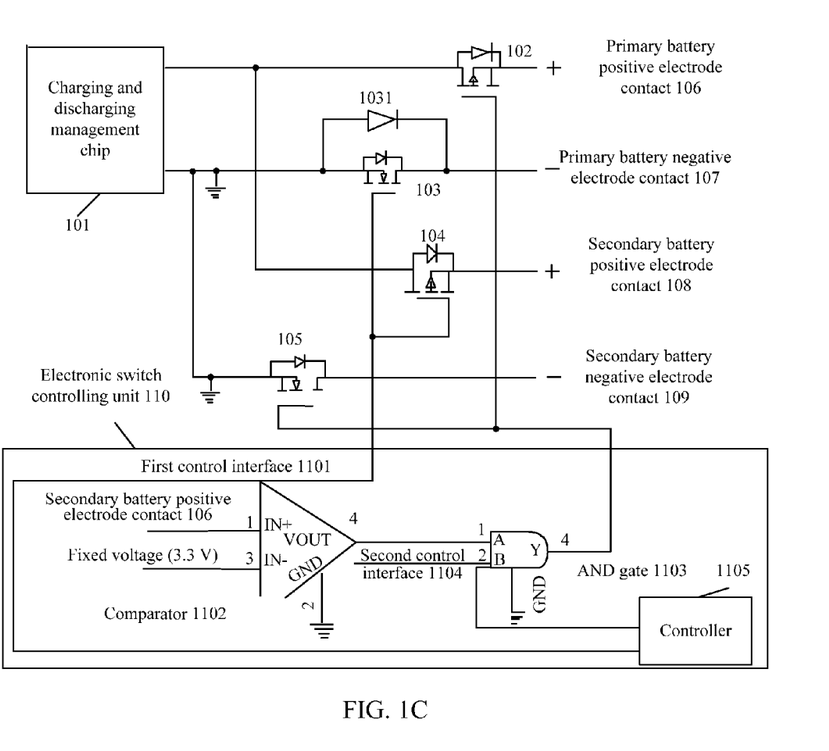
FIG. 1C is a schematic circuit diagram of a dual-battery charging and discharging management apparatus using MOS transistors as electronic switches according to the present invention.

The electronic switches may be MOS transistor electronic switches. FIG. 1C shows a schematic circuit diagram in which the electronic switches are MOS transistors.

As seen from the above embodiments, in the dual-battery charging and discharging management apparatus provided by embodiments of the present invention, a detecting unit is used to detect in-place states of electronic batteries and then an electronic switch controlling unit is used to control electronic switches to be on/off according to the in-place states of the batteries detected by the detecting unit; thereby, a charging and discharging management chip can perform charging and discharging management for a battery in place, and a mobile terminal using the dual-battery charging and discharging management apparatus can be powered by using two batteries, so that the mobile terminal product is allowed not be powered off when one battery is exhausted and that a user of the mobile terminal product still can use the mobile terminal product conveniently. In addition, because the mobile terminal product may be powered by using two or more batteries, when one battery of the mobile terminal product is exhausted, it is not necessary to power off the mobile terminal product. That is, the exhausted battery may be taken off and be charged by using a charging device without powering off the mobile terminal product. Meanwhile, when both batteries of the mobile terminal product are unexhausted, hot swapping of a secondary battery of the mobile terminal product is supported.

Figure 2:
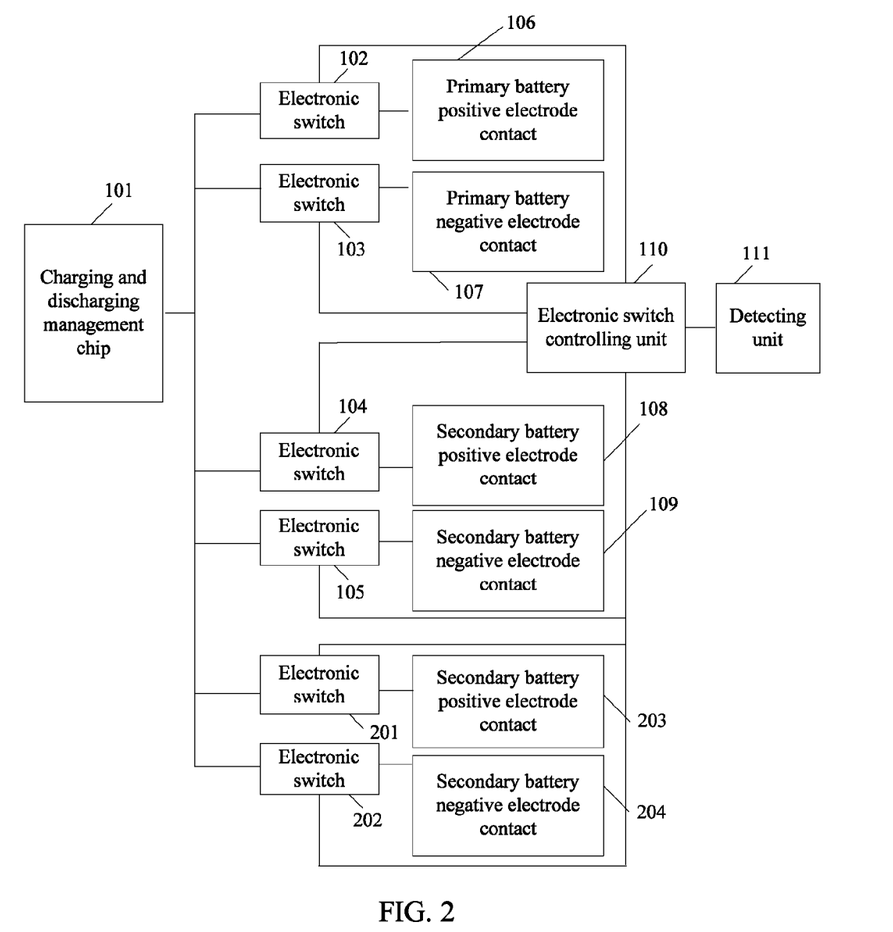
FIG. 2 is a schematic diagram of a three-battery charging and discharging management apparatus according to an embodiment of the present invention.

FIG. 2 shows a three-battery charging and discharging management apparatus according to an embodiment of the present invention, where the three-battery charging and discharging management apparatus is used to manage charging and discharging of three batteries. The charging and discharging management apparatus includes a charging and discharging management chip 101, a primary battery positive electrode contact 106, a primary battery negative electrode contact 107, a first secondary battery positive electrode contact 108, a first secondary battery negative electrode contact 109, a second secondary battery positive electrode contact 203, a second secondary battery negative electrode contact 204, an electronic switch 102 connected to the primary battery positive electrode contact 106, an electronic switch 103 connected to the primary battery negative electrode contact 107, an electronic switch 104 connected to the first secondary battery positive electrode contact 108, an electronic switch 105 connected to the first secondary battery negative electrode contact 109, an electronic switch 201 connected to the second secondary battery positive electrode contact 203, an electronic switch 202 connected to the second secondary battery negative electrode contact 204, an electronic switch controlling unit 110 connected to the electronic switches 102, 103, 104, 105, 201, and 202, and a detecting unit 111 connected to the electronic switch controlling unit 110.

The working process of the three-battery charging and discharging management apparatus is as follows:

The detecting unit 111 detects in-place states of a primary battery and secondary batteries. The detecting unit 111 may detect an in-place state of a battery by temp detection, that is, detecting a temperature detection pin of the battery; or may detect an in-place state of a battery by using an ID wire of the battery.

The electronic switch controlling unit 110 controls the electronic switches to be on/off according to the in-place states of the primary battery and the secondary batteries detected by the detecting unit 111, so that the charging and discharging management chip performs charging and discharging management for a battery in place. Specifically, when the detecting unit 111 detects that the primary battery is in place while a first secondary battery and a second secondary battery are out of place, the electronic switch controlling unit 110 controls the electronic switch 102 and the electronic switch 103 to be on, so that the charging and discharging management chip performs charging and discharging management for the primary battery. When the detecting unit 111 detects that the first secondary battery is in place while the primary battery and the second secondary battery are out of place, the electronic switch controlling unit 110 controls the electronic switch 104 and the electronic switch 105 to be on, so that the charging and discharging management chip performs charging and discharging management for the first secondary battery. When the detecting unit 111 detects that the second secondary battery is in place while the primary battery and the first secondary battery are out of place, the electronic switch controlling unit 110 controls the electronic switch 201 and the electronic switch 202 to be on, so that the charging and discharging management chip performs charging and discharging management for the second secondary battery. When the detecting unit 111 detects that at least two of the primary battery, the first secondary battery, and the second secondary battery are in place, the electronic switch controlling unit 110 controls the electronic switches to be on/off according to actual situations so that the charging and discharging management chip performs charging and discharging management for the primary battery, the first secondary battery, or the second secondary battery. For example, when the primary battery and the first secondary battery are in place and the capacity of the primary battery is sufficient while the capacity of the first secondary battery is insufficient, the electronic switch controlling unit 110 controls the electronic switch 102 and the electronic switch 103 to be on, so that the charging and discharging management chip performs charging and discharging management for the primary battery; otherwise, controls the electronic switch 104 and the electronic switch 105 to be on so that the charging and discharging management chip performs charging and discharging management for the first secondary battery. Charging and discharging management for batteries when the other two or more than two batteries are in place is similar to the processing when the primary battery and the first secondary battery are in place at the same time, and will not be described herein.

The electronic switches may be MOS transistor electronic switches.

Figure 2A:
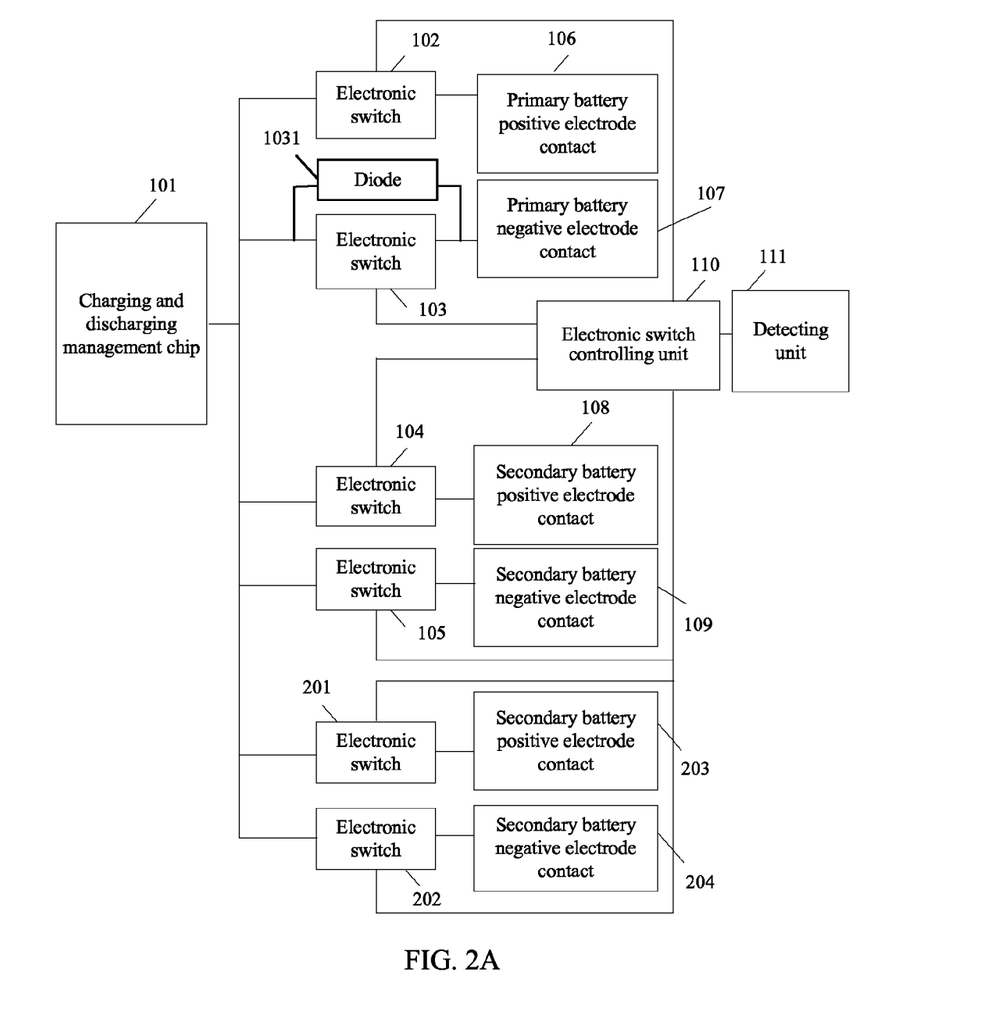
FIG. 2A is a schematic diagram of a three-battery charging and discharging management apparatus according to another embodiment of the present invention.

A diode may be connected in parallel to the electronic switch 103, as shown in FIG. 2A. That is, the primary battery negative electrode contact may also be connected to the charging and discharging management chip through the diode, so that in an emergency when the electronic switch 103 is not on, the primary battery negative electrode contact may be connected to the charging and discharging management chip through the diode, thereby implementing hot swapping for the secondary battery.

As seen from the above embodiments, in the three-battery charging and discharging management apparatus provided by embodiments of the present invention, a detecting unit is used to detect in-place states of batteries and then an electronic switch controlling unit is used to control electronic switches to be on/off according to the in-place states of the batteries detected by the detecting unit; thereby, a charging and discharging management chip can perform charging and discharging management for a battery in place, and a mobile terminal using the three-battery charging and discharging management apparatus can be powered by using three batteries, so that the mobile terminal product is allowed not be powered off when one battery is exhausted and that a user of the mobile terminal product still can use the mobile terminal product conveniently. In addition, because the mobile terminal product may be powered by using three batteries, when one battery of the mobile terminal product is exhausted, it is not necessary to power off the mobile terminal product. That is, the exhausted battery may be taken off and be charged by using a charging device without powering off the mobile terminal product. Meanwhile, when all of the tree batteries of the mobile terminal product are unexhausted, hot swapping of a secondary battery of the mobile terminal product is supported. A specific procedure for performing charging and discharging management for the batteries is similar to the processing procedure for the dual-battery charging and discharging management apparatus, and will not be described repeatedly herein.

The embodiments described in FIG. 1 and FIG. 2 are merely exemplary embodiments of the present invention. Persons skilled in the art may understand that, in addition to the dual-battery and three-battery cases, a charging and discharging management apparatus according to embodiments of the present invention may be an N-battery charging and discharging management apparatus, where N is a positive integer.

In addition, embodiments of the present invention further provide a mobile terminal. The mobile terminal includes a primary battery, a secondary battery, and a charging and discharging management apparatus described in the above embodiments, where the charging and discharging management apparatus supplies power for the mobile terminal by using the primary battery or the secondary battery. The mobile terminal product is normally a mobile phone, and may also be a mobile terminal such as an MP3, a PAD, a notebook computer, and a data card.

Through the above description of the embodiments, it is clear to persons skilled in the art that the present invention may be accomplished by software plus necessary universal hardware, and definitely may also be accomplished by hardware, but in many cases, the software implementation is preferred. Based on such understanding, the technical solutions of the present invention essentially, or the part contributing to the prior art may be implemented in a form of a software product. The computer software product is stored in a readable storage medium, for example, a floppy disk, hard disk, or optical disk of a computer, and includes several instructions for instructing a computer device (which may be a personal computer, a server, a network device, and the like) to execute the methods described in the embodiments of the present invention.

The foregoing descriptions are merely exemplary embodiments of the present invention, but not intended to limit the protection scope of the present invention. Any variation or replacement that can be easily made by persons skilled in the art without departing from the technical scope disclosed by the present invention shall fall within the protection scope of the present invention. Therefore, the protection scope of the present invention shall be subject to the protection scope of the appended claims.

What is claimed is:

1. A charging and discharging management apparatus comprising:
    a charging and discharging management chip;
    primary battery positive and negative electrode contacts;
    secondary battery positive and negative electrode contacts;
    electronic switches connected to the primary battery positive and negative electrode contacts and the secondary battery positive and negative electrode contacts;
    a detecting unit configured to detect in-place states of a primary battery and a secondary battery; and
    an electronic switch controlling unit connected to the detecting unit and configured to control the electronic switches to be on or off according to the in-place states of the batteries, so that the charging and discharging management chip performs charging and discharging management for a battery in-place;
    wherein the electronic switch controlling unit comprises:
    a controller;
    a first control interface connected to the controller, and connected to the primary battery negative electrode contact and the secondary battery positive electrode contact through the electronic switches;

a second control interface connected to the controller;

a comparator comprising a first comparator input end connected to the secondary battery positive electrode contact, a second comparator input end configured to input a fixed voltage, and a comparator output end;

an AND gate comprising a first AND gate input end connected to the comparator output end, a second AND gate input end connected to the second control interface, and an AND gate output end connected to the primary battery positive electrode contact and the secondary battery negative electrode contact through the electronic switches, wherein the controller controls the electronic switches to be on or off by using the first control interface and the second control interface to enable the charging and discharging management chip to perform charging and discharging management for a battery in-place.

2. The charging and discharging management apparatus according to claim 1, wherein the controller controls the electronic switches to be on or off by using the first control interface according to the in-place states of the primary battery and the secondary battery detected by the detecting unit, so that the primary battery negative electrode contact is connected to the charging and discharging management chip while the secondary battery positive electrode contact is not connected to the charging and discharging management chip, or that the primary battery negative electrode contact is not connected to the charging and discharging management chip while the secondary battery positive electrode contact is connected to the charging and discharging management chip.

3. The charging and discharging management apparatus according to claim 2, wherein when the detecting unit detects that the primary battery is in place while the secondary battery is out of place, the controller controls the electronic switches to be on or off by using the first control interface so that the primary battery negative electrode contact is connected to the charging and discharging management chip while the secondary battery positive electrode contact is not connected to the charging and discharging management chip.

4. The charging and discharging management apparatus according to claim 2, wherein when the detecting unit detects that the secondary battery is in place while the primary battery is out of place, the controller controls the electronic switches to be on or off by using the first control interface so that the primary battery negative electrode contact is not connected to the charging and discharging management chip while the secondary battery positive electrode contact is connected to the charging and discharging management chip, and the controller enables the AND gate by using the second control interface to output HIGH at the AND gate output end to control the electronic switch so that the secondary battery negative electrode contact is connected to the charging and discharging management chip.

5. The charging and discharging management apparatus according to claim 1, wherein the primary battery negative electrode contact is further connected to the charging and discharging management chip through a diode.

6. The charging and discharging management apparatus according to claim 1, wherein the number of the secondary battery positive and negative electrode contacts is at least one pair.

7. A mobile terminal comprising:
a primary battery;
a secondary battery; and
the charging and discharging management apparatus according to claim 1, wherein the charging and discharging management apparatus supplies power for the mobile terminal by using the primary battery or the secondary battery.

8. The mobile terminal according to claim 7, wherein the mobile terminal is a mobile phone.

9. A mobile terminal comprising:
a primary battery;
a secondary battery; and
the charging and discharging management apparatus according to claim 2, wherein the charging and discharging management apparatus supplies power for the mobile terminal by using the primary battery or the secondary battery.

10. A mobile terminal comprising:
a primary battery;
a secondary battery; and
the charging and discharging management apparatus according to claim 3, wherein the charging and discharging management apparatus supplies power for the mobile terminal by using the primary battery or the secondary battery.

11. A mobile terminal comprising:
a primary battery;
a secondary battery; and
the charging and discharging management apparatus according to claim 4, wherein the charging and discharging management apparatus supplies power for the mobile terminal by using the primary battery or the secondary battery.

12. A mobile terminal comprising:
a primary battery;
a secondary battery; and
the charging and discharging management apparatus according to claim 5, wherein the charging and discharging management apparatus supplies power for the mobile terminal by using the primary battery or the secondary battery.

13. A mobile terminal comprising:
a primary battery;
a secondary battery; and
the charging and discharging management apparatus according to claim 6, wherein the charging and discharging management apparatus supplies power for the mobile terminal by using the primary battery or the secondary battery.

14. A mobile terminal comprising:
a primary battery; a secondary battery; and
the charging and discharging management apparatus according to claim 7, wherein the charging and discharging management apparatus supplies power for the mobile terminal by using the primary battery or the secondary battery.

15. The charging and discharging management apparatus according to claim 2, wherein the primary battery negative electrode contact is further connected to the charging and discharging management chip through a diode.

* * * * *

UNITED STATES PATENT AND TRADEMARK OFFICE
CERTIFICATE OF CORRECTION

PATENT NO. : 8,836,275 B2  
APPLICATION NO. : 13/693788  
DATED : September 16, 2014  
INVENTOR(S) : Li et al.

Page 1 of 1

It is certified that error appears in the above-identified patent and that said Letters Patent is hereby corrected as shown below:

Title Page, item [71] Applicant, "Guangdong (CN)" should read --Shenzhen (CN)--.

Signed and Sealed this  
Second Day of June, 2015

Michelle K. Lee  
*Director of the United States Patent and Trademark Office*